United States Patent Office 3,839,467
Patented Oct. 1, 1974

3,839,467
PREPARATION OF HYDROXYLATED
AROMATIC COMPOUNDS
Jerome A. Vesely, Park Ridge, Ill., assignor to Universal
Oil Products Company, Des Plaines, Ill.
No Drawing. Filed Aug. 31, 1972, Ser. No. 285,163
Int. Cl. C07c 37/00
U.S. Cl. 260—619 R                                  9 Claims

ABSTRACT OF THE DISCLOSURE

Hydroxylated aromatic compounds, and particularly hydroxylated benzene compounds, may be prepared by treating the aromatic compound with hydrogen peroxide in the presence of hydrogen fluoride and a solvent which is miscible with both the aromatic compound and the hydrogen fluoride.

This invention relates to a process for the preparation of hydroxylated aromatic compounds and more particularly to a process for preparing hydroxylated aromatic compounds by effecting the reaction in the presence of certain solvents.

It is known in the prior art to hydroxylate aromatic compounds by treating the compound with hydrogen peroxide in the presence of hydrogen fluoride. However, certain aromatic compounds when treated with hydrogen peroxide in the presence of a catalyst comprising hydrogen fluoride do not yield desired hydroxylated products. A specific example of this is the hydrogen fluoride-catalyzed interaction of benzene and hydrogen peroxide which will result in the formation of tars rather than a hydroxylated product. Heretofore the only manner in which benzene could be hydroxylated using hydrogen fluoride as a catalyst was to employ a catalyst system comprising hydrogen fluoride with a carbon dioxide additive. However, the use of the carbon dioxide additive necessitated the use of pressure sensitive equipment in order to effect the reaction. In contradistinction to this, as will be hereinafter shown in greater detail, I have now discovered that use of a solvent which is miscible both with the aromatic compound substrate and the hydrogen fluoride as well as being substantially refractory to the action of the hydrogen fluoride and hydrogen peroxide will permit the hydroxylation of an unsubstituted aromatic compound such as benzene. By utilizing this solvent system at ambient pressures, it is possible to effect the reaction in relatively simple hydroxylation equipment, thus obviating the aforesaid necessity for expensive pressure sensitive equipment.

Aromatic compounds which contain one or more hydroxyl substituents on the aromatic ring will find a wide variety of uses in the chemical field. For example, phenol is an important intermediate in the preparation of phenolic resins, epoxy resins, nylon, weed killers, as a selective solvent for refining lubricating oils, salicylic acid, picric acid, germicidal paints, and pharmaceuticals. Hydroxynaphthalene which is also known as α-naphthol or β-naphthol is used in dyes, synthetic perfumes, pigments, anti-oxidants for rubber, fats, oils, insecticides or in organic synthesis of fungicides, pharmaceuticals and perfumes.

Dihydroxylated aromatics such as hydroquinone, catechol, dihydroxynaphthalene, etc., find a wide variety of uses in the chemical field. For example, hydroquinone is an important chemical which is utilized in photographic developers, in dye intermediates, in medicine, as an anti-oxidant for fats and oils, as an inhibitor in coating compounds for rubber, stone and textiles, in paints and varnishes, as well as in motor fuels and oils. In addition, it is an intermediate for preparing mono- and dibenzyl ethers of hydroquinone, the latter compounds being used in perfumes, plastics and pharmaceuticals. Catechol finds a wide variety of uses as an antiseptic, in photography, dyestuffs, antioxidants and light stabilizers; furthermore, it is an intermediate for the preparation of the dimethyl ether of catechol which is used as an antiseptic and for the monomethyl ether of catechol which is guaiacol, guaiacol being an important component of many medicines.

Hydroquinone is ordinarily prepared by oxidizing aniline to quinone utilizing manganese dioxide and thereafter reducing the quinone to hydroquinone. Likewise catechol is usually prepared by fusion of o-phenolsulfonic acid with caustic potash at a relatively high temperature of about 350° C. or by heating guaiacol with hydroiodic acid. This latter step is somewhat expensive and time consuming inasmuch as guaiacol is prepared by the somewhat intricate process system of extracting beechwood creosote with alcoholic potash, washing with ether, crystallizing the potash compound with alcohol and decomposing the compound with dilute sulfuric acid; or guaiacol can be obtained by diazotization of o-anisidine followed by treatment with dilute sulfuric acid.

Polyhydroxylated aromatic compounds such as pyrogallol (1,2,3-trihydroxybenzene) may be used as a protective colloid in the preparation of metallic colloidal solutions, in photography, dyes, synthetic drugs, process engraving, antioxidants, in lubricating oils, etc. Phloroglucinol (1,3,5-trihydroxybenzene) is used in analytical chemistry, medicines and in the preparation of pharmaceuticals, dyes and resins.

Other hydroxylated aromatic compounds also find important uses in the chemical industry as exemplified by the isomeric cresols (o-methylphenol, m-methylphenol, p-methylphenol) which are used as disinfectants, antiseptics, wetting agents, etc. Likewise the methoxyphenols, which may be prepared from anisole, such as hydroquinone monomethyl ether is used in the manufacture of antioxidants, pharmaceuticals, plasticizers, dyestuffs, stabilizers and inhibitors.

In view of the importance of the aforementioned hydroxylated aromatic compounds, the necessity of obtaining these compounds by relatively inexpensive procedures is of importance to the chemical industry, and it is therefore an object of this invention to provide an improved process for obtaining hydroxylated aromatic compounds.

A further object of this invention is to provide a process for preparing hydroxylated aromatic compounds by effecting the hydroxylation reaction in a medium comprising certain organic solvents.

In one aspect an embodiment of this invention resides in a process for the hydroxylation of an aromatic compound which comprises treating said compound with hydrogen peroxide at hydroxylation conditions in the presence of hydrogen fluoride and a solvent which is mutually miscible with both the aromatic compound and the hydrogen fluoride, and recovering the resultant hydroxylated aromatic compound.

A specific embodiment of this invention is found in a process for the hydroxylation of an aromatic compound which comprises treating benzene with hydrogen peroxide at a temperature in the range of from about −10° to about 100° C. in the presence of hydrogen fluoride and a solvent comprising nitrobenzene, and recovering the resultant mixture of phenol, catechol and hydroquinone.

Other objects and embodiments will be found in the following further detailed description of the present invention.

As hereinbefore set forth, the present invention is concerned with a process for preparing hydroxylated aromatic compounds, particularly from unsubstituted aromatic hydrocarbons, by effecting the hydroxylation in a medium comprising a solvent which is mutually miscible with both the aromatic compound and the catalyst comprising hydrogen fluoride. The hydroxylation reaction is effected by treating the aromatic compound with hydrogen peroxide in the presence of a catalyst comprising hydrogen fluoride and, as hereinbefore set forth, the mutually miscible solvent at hydroxylation conditions hereinafter set forth in greater detail.

The starting materials which may be utilized in the process of this invention will comprise aromatic hydrocarbons as well as derivatives thereof. For the purposes of this invention the term "aromatic compound" as used in the present specification and appended claims will refer to these hydrocarbons and derivatives thereof and will include unsubstituted aromatic hydrocarbons such as benzene, naphthalene, anthracene, phenanthrene, chrysene, biphenyl, etc.; primary, secondary and tertiary substituted alkyl aromatic hydrocarbons such as toluene, o-xylene, m-xylene, p-xylene, ethylbenzene, n-propylbenzene, isopropylbenzene (cumene), n-butylbenzene, t-butylbenzene, n-pentylbenzene, sec-pentylbenzene, t-pentylbenzene, etc.; cyclopentylbenzene, cyclohexylbenzene, 1-methylnaphthalene, 2-methylnaphthalene, 1-ethylnaphthalene, 2-ethylnaphthalene, 1-n-propylnaphthalene, 2-n-propylnaphthalene, 1-isopropylnaphthalene, 2-isopropylnaphthalene, 1-t-butylnaphthalene, 2-t-butylnaphthalene, 1,2-dimethylnaphthalene, 1,2-diethylnaphthalene, methylbiphenyl, ethylbiphenyl, propylbiphenyl, etc.; hydroxy substituted aromatic compounds such as phenol, hydroquinone, catechol, resorcinol, pyrogallol, hydroxyhydroquinone, phloroglucinol, 1-hydroxynaphthalene, 2-hydroxynaphthalene, 1,2-dihydroxynaphthalene, etc.; alkoxy substituted aromatic compounds such as anisole, phenetole, n-propoxybenzene, o-methylanisole, m - methylanisole, p-methylanisole, o-methylphenetole, m-methylphenetole, etc.; haloalkyl aromatic compounds such as o-chlorotoluene, m-chlorotoluene, p-chlorotoluene, o-bromotoluene, m-bromotoluene, p-bromotoluene, o-chloroethylbenzene, m-chloroethylbenzene, p-chloroethylbenzene, o-bromoethylbenzene, m-ethylbenzene, p-ethylbenzene, 2 - chloro - 1 - methylnaphthalene, 2-bromo-1-methylnaphthalene, 4 - chloro - 1-methylnaphthalene, 4-bromo-1-methylnaphthalene, 2-chloro-1-ethylnaphthalene, 4-bromo-1-ethylnaphthalene, etc.; hydroxyalkyl aromatic compounds such as benzyl alcohol, 2-phenylethyl alcohol, 3-phenylpropyl alcohol, 4-phenylbutyl alcohol, etc.; aromatic carbohydrate derivatives of aromatic compounds such as 1,1-diphenyl-1-desoxy-D-glucitol, 1,1-ditolyl-1-desoxy-D-glucitol, 1,1 - bis(p-isopropylphenyl)-1-desoxy-D-glucitol, 1,1-bis(p-methoxyphenyl)-1-desoxy-D-glucitol, 1,1-bis(p-hydroxyphenyl)-1-desoxy-D-glucitol, the corresponding aromatic derivatives of other hexoses (fructose, sorbose, tagatose, psicose, idose, gulose, talose) glycolaldehyde trioses, tetraoses, pentaoses, etc. It is to be understood that the aforementioned compounds are only representative of the type of aromatic compounds and derivatives thereof which may be utilized as starting materials in the hydroxylation process of the present invention and that said invention is not necessarily limited thereto. These aromatic compounds may be characterized by the generic formula: $ArX_n$ in which Ar is a monocyclic or polycyclic aromatic hydrocarbon nucleus, X is independently selected from the group consisting of hydrogen, halogen, n-alkyl, sec-alkyl, t-alkyl, cycloalkyl, hydroxyl, alkoxyl and hydroxyalkyl radicals and n is an integer of from 1 to 3.

The process of this invention is effected by treating an aromatic compound of the type hereinbefore set forth in greater detail with hydrogen peroxide in the presence of catalyst comprising hydrogen fluoride at hydroxylation conditions which include a temperature in the range of from about −10° to about 100° C. and preferably in a range of from about 0° to about 40° C. In the preferred embodiment of the invention the process is effected at ambient or atmospheric pressure. However, superatmospheric pressures may be employed, if so desired, the amount of pressure which is utilized being that which is sufficient to maintain a major portion of the rectants in the liquid phase. The hydrogen peroxide which comprises one of the starting materials may be present in an aqueous solution containing from 5 to 90% or more of hydrogen peroxide. The preferable hydrogen peroxide solution will contain a 30 or 50% or higher concentration of hydrogen peroxide inasmuch as, when utilizing a lesser amount, the aqueous portion of the solution will tend to dilute the catalyst which is preferably charged to the reaction zone in anhydrous form. When the concentration of the hydrogen fluoride falls below a figure of about 60 to 70% the reaction will slow down and eventually cease. Therefore it is necessary to maintain the concentration of the hydrogen fluoride in an amount greater than 60% and preferably greater than 80%, thus necessitating the use of a relatively concentrated hydrogen peroxide solution. It is also contemplated, if so desired, that an additional compound such as boron trifluoride or a ferrous fluoroborate having the formula: $FeF_2 \cdot BF_3$ may be utilized as a promoter to increase the catalytic activity, thereby permitting the reaction to proceed in such a manner so as to provide increased yields of the desired product.

As hereinbefore set forth the hydroxylation is effected in a solvent medium in which the solvent comprises a compound which is mutually miscible with both the substrate comprising the aromatic compound and the hydrogen fluoride catalyst, a further criterion being that the solvent is substantially refractory to the action of the hydrogen fluoride and the hydrogen peroxide. By employing this type of solvent, escpecially when utilizing an unsubstituted aromatic hydrocarbon such as benzene as the starting material, it is possible to solubilize enough of the unsubstituted aromatic compound such as benzene to prevent the mono- and dihydroxy derivatives from being further reacted to yield, as a chief product thereof, high boiling tars, which decrease the yield of the desired products comprising mono- and polyhydroxylated product. Some specific examples of these compounds which may be utilized as solvents for the process of this invention will include nitroparaffins such as 2-nitropropane, 1-nitrobutane, 2-nitrobutane, 1-nitro-2-methylpropane, 1-nitropentane, 3-nitropentane, 2-nitro-2-methylbutane, 4-nitro-2-methylbutane, 1-nitrohexane, 2-nitro-2-methylpentane, 2-nitroheptane, 2-nitro-2,4-dimethylpentane, 3-nitro-2,2-dimethylpentane, 3-nitro-2-ethylpentane, 1-nitrooctane, 1-nitro-2,5-dimethylhexane, 1-nitro-2,5-diethylhexane, 1-nitrononane, 2 - nitro-2,6-dimethylheptane, 1-nitro-2,7-dimethyloctane, etc.; nitroaromatic compounds such as nitrobenzene, o-nitrotoluene, m-nitrotoluene, etc.; amino substituted compounds such as aniline, etc.; or organo sulfur compounds such as sulfolane (tetramethylsulfone), etc. It is to be understood that the aforementioned list of solvents which are mutually miscible for both the substrate and hydrogen fluoride catalyst are only representative of the type of solvents which may be used, and that the present invention is not necessarily limited thereto.

The obtention of either a mono-hydroxylated compound or a polyhydroxylated compound can be varied according to the amount of aromatic compound which is treated with hydrogen peroxide in the presence of the hydrogen fluoride catalyst. For example, if a mono-hydroxylated compound is desired, an excess of the starting aromatic compound will be used. Conversely, if a polyhydroxylated compound comprises the desired product the relative amount of hydrogen peroxide which is used will be increased. Generally speaking, the aromatic compound will be present in a mole ratio in the range of from about 3:1 to about 15:1 moles of aromatic compound per mole of hydrogen peroxide, although greater or lesser amounts of aromatic compounds may also be used.

The process of this invention may be effected in any suitable manner and may comprise either a batch or continuous type operation. For example, when a batch type operation is used, a quantity of the aromatic compound which is to undergo hydroxylation is placed in an appropriate apparatus. This apparatus may comprise a flask provided with cooling or heating means, hydrogen peroxide introductory means, etc. or it may comprise an autoclave of the stirring or rotating type. The flask or autoclave will contain the solvent which is mutually miscible with both the aromatic compound and the hydrogen fluoride. In addition, the hydrogen fluoride is also placed in the apparatus which is thereafter heated or cooled to the desired temperature and maintained thereat during the reaction period which may vary from 0.5 hours up to about 10 hours or more in duration. As hereinbefore set forth in the preferred embodiment of this invention the reaction may be effected at ambient temperatures thus obviating the necessity for the aforementioned heating or cooling means. The hydrogen peroxide is added to the reaction mixture under controlled conditions and the reaction is allowed to proceed for a predetermined residence time. Upon completion of the desired residence time the catalyst is purged from the apparatus utilizing a stream of inert gas such as nitrogen as the purging agent. The reaction mixture is recovered then subjected to conventional means of separation and recovery of the desired product, said means including washing the mixture with an inert organic solvent, neutralizing any hydrogen fluoride which may still be present, flashing off the solvent and subjecting the reaction mixture to fractional distillation whereby the desired hydroxylated product is recovered.

It is also contemplated within the scope of this invention that the reaction may be effected in a continuous manner of operation. When such a type of operation is used the aromatic compound is continuously charged to a reaction zone which is maintained at the proper operating conditions of temperature and pressure. In addition the hydrogen peroxide in the form of an aqueous solution containing from 5% up to 90% or more hydrogen peroxide, and preferably containing from about 30% to 50% hydrogen peroxide and the hydrogen fluoride catalyst are also continuously charged to the reaction zone. Likewise the solvent which is mutually miscible with both the aromatic compound and the hydrogen fluoride is charged to this reactor through a separate line or, if so desired, the aromatic compound and/or the hydrogen fluoride may be admixed with the solvent prior to entry into said reactor and the resulting mixture charged thereto in a single stream. Upon completion of the desired residence time in the reactor, the effluent is continuously withdrawn and subjected to treatment similar to that hereinbefore set forth whereby the desired hydroxylated aromatic compound is separated and recovered while any unreacted starting materials and solvent are recycled to the reaction zone to form a portion of the feed stock.

Examples of hydroxylated aromatic compounds which may be prepared according to the process of this invention will include phenol, catechol, hydroquinone, hydroxyhydroquinone, pyrogallol, guaiacol, o-cresol, p-cresol, 2-hydroxy-p-xylene, 4-hydroxy-o-xylene, o-ethylphenyl, 2,4-dihydroxyethylbenzene, 2 - hydroxycumene, 4 - hydroxycumene, 2 - hydroxy-t-butylbenzene, 4 - hydroxy-t-butylbenzene, 1-hydroxynaphthalene, 2 - hydroxynaphthalene, 1,2-dihydroxynaphthalene, 2 - hydroxy-1-methylnaphthalene, 2,4-dihydroxy - 1 - methylnaphthalene, 1-hydroxy-2-methylnaphthalene, 1,4 - dihydroxy-2-methylnaphthalene, 2-hydroxy-2-methylanthracene, 2,4 - dihydroxy-1-methylanthracene, 2-hydroxyphenetole, 2,4-dihydroxyanisole, 2,4-dihydroxyphenetole, 2 - hydroxy-p-methylanisole, 2-hydroxy-p-ethylanisole, 2,4 - xylenol, o-methoxyphenol, p-methoxyphenol, ethylphenol, ethylcatechol, ethylhydroquinone, 2-hydroxychlorobenzene, 4-hydroxychlorobenzene, 2-hydroxynitrobenzene, 4-hydroxynitrobenzene, 2,4-dihydroxynitrobenzene, 2-hydroxy-p-chlorotoluene, 2-hydroxy-p-bromotoluene, 4-hydroxy-o-chlorotoluene, 4-hydroxy-o-bromotoluene, etc. It is to be understood that the aforementioned compounds are only representative of the class of hydroxylated aromatic compounds which may be prepared by hydroxylating an aromatic compound by treatment with hydrogen peroxide in the presence of a catalyst comprising hydrogen fluoride and in a medium comprising a solvent which is mutually miscible with both aromatic compound and the hydrogen fluoride, and that the present invention is not necessarily limited thereto.

The following examples are given to illustrate the process of the present invention which, however, are not intended to limit the generally broad scope of the present invention in strict accordance therewith.

EXAMPLE I

In this example 234 g. of benzene along with 200 cc. of nitrobenzene and 236 g. (11.8 mole) of hydrogen fluoride were placed in a 1-liter stainless steel turbomixer autoclave. Following this 0.39 mole of hydrogen peroxide was gradually added to the reactor during a period of 50 minutes, the temperature of the autoclave being maintained in a range of from 24° to 27° C. The mole ratio of benzene to hydrogen peroxide was 7.7:1. The mixture was stirred for an additional period of 20 minutes while maintaining the temperature in the aforesaid range. At the end of this time, the hydrogen fluoride was swept out of the autoclave with a stream of nitrogen for a period of 2 hours before the autoclave was opened.

The reaction mixture was transferred to a breaker and the reactor parts were washed with benzene, the washings being added to the reaction product. The solution was decanted into another vessel thereby separating out an aqueous acid phase which contained some benzene insoluble product. The decanted benzene solution was treated to remove residual hydrogen fluoride by neutralization with calcium carbonate, filtered under suction and distilled to remove the benzene. The benzene insoluble product which remained was combined with the product from the aqueous acid phase and extracted with ether. The ether was flashed off and the bottoms from both product segments were combined and subjected to fractional distillation under reduced pressure. Analysis of the distillation cuts by means of infra-red and nuclear magnetic resonance disclosed the presence of a 29 mole percent yield of phenol, a 14 mole percent yield of hydroquinone and an 11 mole percent yield of catechol.

EXAMPLE II

To ilustrate the operability of another type of solvent which is mutually miscible with both benzene and hydrogen fluoride, the reaction of 3 miles of benzene, 23.5 moles of hydrogen fluoride and 0.2 mole of hydrogen peroxide along with a solvent comprising 101 g. of aniline resulted in the obtention of a 29 mole percent yield of phenol, a 9 mole percent yield of catechol and a 21 mole percent yield of hydroquinone.

EXAMPLE III

To a 1-liter stainless steel turbomixer autoclave is charged 356.4 g. (2.0 mole) of toluene, 420 g. (21.0 mole) of hydrogen fluoride and 200 cc. of a mutually miscible solvent comprising nitrobenzene. Following this 0.25 mole of hydrogen peroxide is slowly added to the mixture during a period of 30 minutes while maintaining the temperature of the autoclave in a range of from about 20° to 25° C. At the end of the addition of the hydrogen peroxide, the resulting mixture is stirred for an additional period of 15 minutes, the temperature of the autoclave being maintained in the aforestaid range. At the end of the total contact time of 45 minutes, the hydrogen fluoride is purged from the reactor by means of a stream of nitrogen passing therethrough for a period of 2 hours. Thereafter the reaction mixture is recovered and the autoclave is washed with benzene. The washings are combined with the reaction mixture and decanted to a second vessel whereby an aqueous acid phase containing some benzene insoluble product is separated. The benzene solution is treated with calcium carbonate to remove any residual hydrogen fluoride which still may be present in the solution, filtered under suction and distilled to remove the benzene. The benzene insoluble product is combined with the product from the aqueous acid phase and extracted with ether. The ether extract is subjected to removal of the ether by flashing and the bottoms are combined with the bottoms from the benzene solution. The combined bottoms are subjected to fractional distillation under reduced pressure whereby the desired cuts comprising a mixture of $\alpha$-hydroxyanthracene and $\beta$-hydroxyanthracene is separated out.

EXAMPLE IV

In this example 384.5 g. (3.0 mole) of naphthalene along with 400 g. (20.0 mole) of hydrogen fluoride and 200 cc. of mutually miscible solvent comprising 2-nitropropane are placed in a stainless steel turbomixer autoclave. The autoclave is cooled to a temperature of about 0° C. by means of an ice bath and 0.3 mole of hydrogen peroxide is slowly added thereto during a period of 30 minutes. The resulting mixture is stirred for an additional period of 30 minutes while maintaining the low temperature of the autoclave. At the end of the total contact time of 60 minutes, the hydrogen fluoride is purged from the reactor by means of a stream of nitrogen. The reaction mixture is recovered and subjected to treatment similar to that set forth in the above examples, distillation of the combined bottoms from the two product segments resulting in the separation of a mixture of $\alpha$-hydroxynaphthalene and $\beta$-hydroxynaphthalene.

EXAMPLE V

To a stainless steel turbomixer autoclave is charged 462.6 g. (3.0 mol) of biphenyl, 300 g. (15.0 mole) of hydrogen fluoride and 200 cc. of aniline. The autoclave is cooled to a temperature of about 4° C. by means of an ice bath and thereafter 0.2 mole of hydrogen peroxide is slowly added thereto during a period of 30 minutes. Upon completion of the addition of the hydrogen peroxide, the mixture is stirred for an additional period of 15 minutes while maintaining the temperature of the autoclave in a range of from about 4° to 10° C. At the end of the 45 minute contact time, a stream of nitrogen is pressed through the autoclave for a period of 2 hours whereby the hydrogen fluoride is purged therefrom. At the end of this period, the reaction mixture is recovered and the autoclave is washed with benzene. The benzene washings are combined with reaction mixture and decanted into another vessel. An aqueous acid phase which contains some benzene insoluble product is separated from the benzene solution, this latter solution is then treated with calcium carbonate to remove any residual hydrogen fluoride which still may be present, filtered under suction and distilled to remove the benzene. The benzene insoluble product is combined with the aqueous acid phase and the solution is extracted with ether, following which the ether is removed from the extract by flashing off. The bottoms from both segments are combined and subjected to fractional distillation under reduced pressure. Analysis of specific distillation cuts by means of infra-red will disclose the presence of a mixture of phenylphenols.

EXAMPLE VI

In this example 318 g. (3.0 mole) of ethylbenzene, 300 g. (15.0 mole) of hydrogen fluoride and 200 cc. of p-toluene sulfonic acid are placed in a stainless steel turbomixer autoclave. Following this 0.25 mole of hydrogen peroxide is slowly added to the autoclave during a period of 30 minutes while maintaining the temperature of the autoclave in a range of from about 18° to 21° C. At the end of the 30-minute addition time, the mixture is stirred for a period of 15 minutes while maintaining the temperature of the autoclave in the aforesaid range. At the end of the 45 minute contact time, the hydrogen fluoride is purged from the autoclave by means of a stream of nitrogen. At the end of the purging period, the reaction mixture is recovered and subjected to treatment similar to that set forth in the above examples. Analysis of the distillation of the combined bottoms segments will disclose the presence of a mixture of ethylphenol, ethylcatechol and ethylhydroquinone.

I claim as my invention:

1. In a process for the hydroxylation of an unsubstituted aromatic hydrocarbon by reaction of said compound with hydrogen peroxide at hydroxylation conditions in the presence of hydrogen fluoride, the improvement which comprises effecting said reaction in the presence of a solvent which is mutually miscible with both the aromatic compound and the hydrogen fluoride and which is refractory to the action of the hydrogen fluoride and hydrogen peroxide, said solvent being selected from the group consisting of nitroparaffins, nitroaromatics, aniline and tetramethylsulfone, and recovering the resultant hydroxylated aromatic compound.

2. The process as set forth in Claim 1 in which said hydroxylation conditions include a temperature in the range of from about $-10°$ to about $100°$ C. and a pressure in the range of from atmospheric to about 100 atmospheres.

3. The process as set forth in Claim 1 in which said mutually miscible solvent is nitrobenzene.

4. The process as set forth in Claim 1 in which said mutually miscible solvent is aniline.

5. The process as set forth in Claim 1 in which said aromatic compound is benzene and said hydroxylated aromatic compound is a mixture of phenol, catechol and hydroquinone.

6. The process as set forth in Claim 1 in which said aromatic compound is anthracene and said hydroxylated aromatic compound is a mixture of $\alpha$-hydroxyanthracene and $\beta$-hydroxyanthracene.

7. The process as set forth in Claim 1 in which said aromatic compound is naphthalene and said hydroxylated aromatic compound is a mixture of $\alpha$-hydroxynaphthalene and $\beta$-hydroxynaphthalene.

8. The process as set forth in Claim 1 in which said aromatic compound is biphenyl and said hydroxylated aromatic compound is a mixture of phenylphenols.

9. The improvement of Claim 1 in which said solvent is a nitroparaffin.

References Cited
UNITED STATES PATENTS

| | | | |
|---|---|---|---|
| 3,461,170 | 8/1969 | Schmerling | 260—621 G X |
| 3,481,989 | 12/1969 | Vesely et al. | 260—621 G X |
| 3,453,332 | 7/1969 | Vesely et al. | 260—621 G X |
| 3,407,237 | 10/1968 | Vesely | 260—621 G |

HOWARD T. MARS, Primary Examiner

N. P. MORGENSTERN, Assistant Examiner

U.S. Cl. X.R.

260—620, 621 G